United States Patent [19]

Blok

[11] Patent Number: 5,152,808
[45] Date of Patent: Oct. 6, 1992

[54] DRAINAGE COUPLING MEMBER

[75] Inventor: Christiaan Blok, Roermond, Netherlands

[73] Assignee: Rockwool/Grodan B.V., Melick-Herhenbosch, Netherlands

[21] Appl. No.: 556,100

[22] Filed: Jul. 19, 1990

[30] Foreign Application Priority Data

Jul. 20, 1989 [NL] Netherlands .......................... 8901881

[51] Int. Cl.⁵ .............................................. A01G 31/00
[52] U.S. Cl. .......................................... 47/59; 47/62; 405/45
[58] Field of Search ................... 47/62, 59; 405/45 X

[56] References Cited

U.S. PATENT DOCUMENTS

| | | |
|---|---|---|
| 2,491,124 | 12/1946 | Martin . |
| 3,427,810 | 2/1969 | Petersen ............................. 405/43 |
| 3,902,323 | 9/1975 | Watanabe ............................ 405/43 |
| 4,403,446 | 9/1983 | Wolfe .................................... 47/62 |
| 4,630,394 | 12/1986 | Sherard . |
| 4,740,104 | 4/1988 | Stöhr ................................... 405/45 |

FOREIGN PATENT DOCUMENTS

| | | | |
|---|---|---|---|
| 35769 | 9/1909 | Austria ................................ 405/45 |
| 0136476A3 | 7/1985 | European Pat. Off. . |
| 0300536A1 | 3/1989 | European Pat. Off. . |
| 3917463 | 12/1989 | Fed. Rep. of Germany .......... 47/59 |
| 2255013 | 3/1989 | Japan .................................. 47/59 |
| 362602 | 12/1931 | United Kingdom .................. 405/45 |

*Primary Examiner*—Henry E. Raduazo
*Attorney, Agent, or Firm*—Christensen, O'Connor, Johnson & Kindness

[57] ABSTRACT

The invention relates to a system, in which water, optionally mixed with nutrients, is supplied to a substrate used for horticulture. Commonly an excess of water is supplied, so that it is necessary to drain the excess. Usually this is achieved by providing drainage hoses, in which an underpressure is maintained. To avoid that the roots of the plants grown in the substrate grow into the hoses and block these, the invention provides coupling members for coupling mineral wood to a drainage hose, when said coupling member is formed by a porous body arranged at least partly in said mineral wool and provided with a cavity connected to said drainage hose. According to a preferred embodiment the porous body of said coupling member is formed by mineral wool compressed such, that the density thereof is greater than the density of the non-compressed mineral wool.

18 Claims, 1 Drawing Sheet

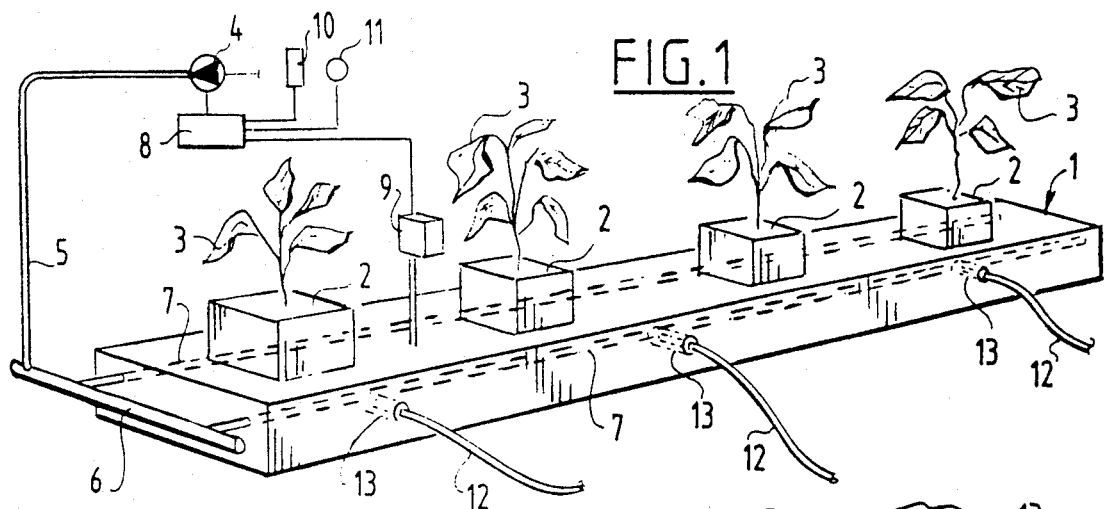
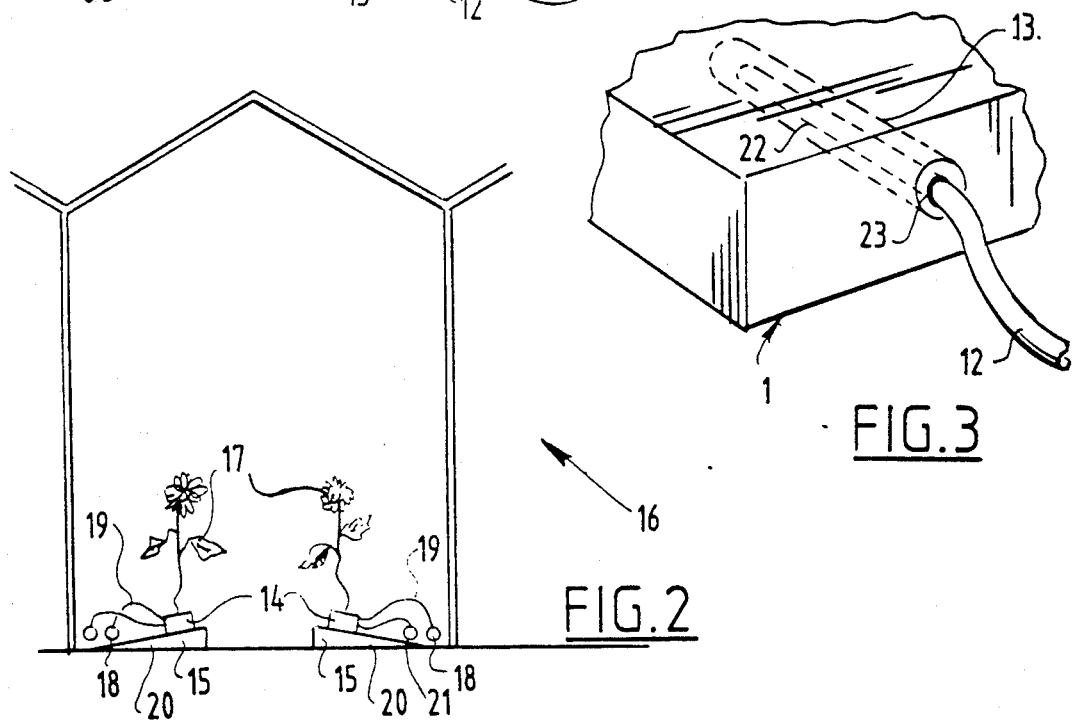
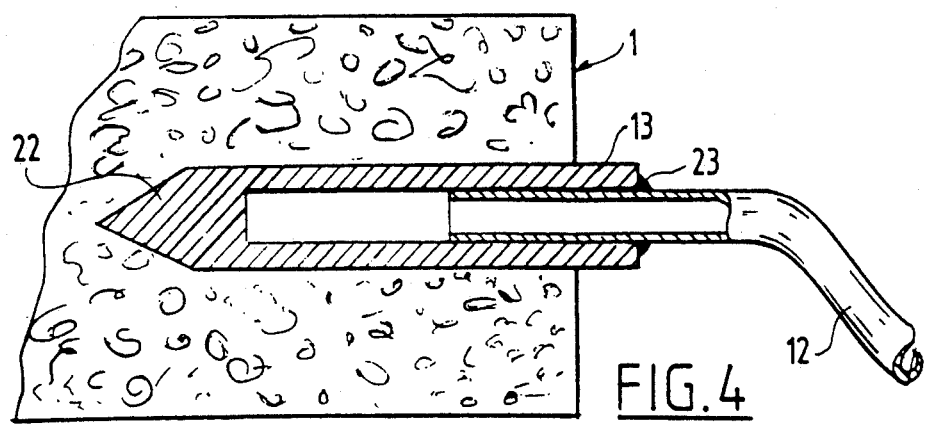

DRAINAGE COUPLING MEMBER

FIELD OF THE INVENTION

The present invention relates to a coupling member for coupling rock-wool to a drainage hose.

BACKGROUND OF THE INVENTION

Known from EP-A-0 300 536 is the culture of plants on substrate that is formed by rock-wool.

This literature reference further describes a system for supplying water, optionally mixed with nutrients, to the substrate in order to foster the best possible growth of the plant. It is usual to supply an excess of water.

There are various reasons herefor, such as: to prevent the accumulation of ballast salts, to compensate for flow differences in feed members for water, to compensate for differences in the water consumption of different plants, and to restore the correct ratio of the (chemical) elements supplied as nutrients.

It should be noted here that according to the system as described in EP-A-0 300 536 it is possible to considerably limit the excess of water, since using measurement of the degree of moistness of the rock-wool substrate it is possible to determine a reasonable estimate of the water requirement of the plants. It will nevertheless be necessary to discharge an excess of water.

In order to discharge this excess water a drainage system is arranged which in accordance with the cited literature reference is formed by a number of thin hoses extending into the rock-wool substrate and connected onto a drainage pipe with a larger diameter. A certain underpressure is maintained in this drainage pipe so that, partly depending on the capillary properties of the drainage hoses, the excess water is discharged from the rock-wool substrate.

This known system suffers from the drawback that the roots of the plants that are cultivated in the substrate have the tendency to grow to the drainage hoses and even into the drainage hoses, so that these are closed off and a good action is no longer achieved.

There is the further danger that the drainage hoses, which are in general simply inserted into the substrate, are pulled out of their proper position. Since these drainage hoses are only simply inserted into the rock-wool substrate, they can be easily pulled out of their proper position and then no longer fulfil their proper function or can simply be pulled entirely from the rock-wool substrate.

SUMMARY OF THE INVENTION

The object of the present invention is to avoid at least one of the above mentioned drawbacks.

This object is achieved by a coupling member for coupling rock-wool to a drainage hose, wherein the coupling member is formed by a porous body arranged at least partially in the rock-wool and provided with a cavity connected to the drainage hose.

As a result of the coupling member according to the present invention that is made from a porous material, a barrier is created for the plant roots so that they cannot grow into the drainage hose and close it off. Although growth of roots into the pores cannot be wholly eliminated, the fixation of the material of the coupling member and the retaining of form ensuing herefrom prevent the roots growing far into the pores. There are in addition so many pores that they cannot all be closed off by for instance a root.

In addition a better fixation of the drainage hose in the rock-wool substrate is achieved since the drainage hose is fixedly connected to the coupling body and the drainage hose cannot therefore be removed from the substrate without taking with it the coupling body. The coupling body is difficult to remove as a consequence of the frictional forces between the rock-wool substrate and the coupling body.

The dimensioning of the coupling member is otherwise such that the computed excess of water can be discharged easily. According to a preferred embodiment of the invention, the depth to which the hose extends into the cavity of the member can be changed so that in this way the maximum flow of the member can be adapted.

It is noted that it is known to wrap drainage lines in porous material in order to prevent substrate entering the drainage line.

In the case of rock-wool this danger does not exist. The object of the present invention is therefore principally to prevent roots growing into the drainage system.

BRIEF DESCRIPTION OF THE DRAWINGS

The present invention will be elucidated hereinafter with reference to the annexed drawings, wherein:

FIG. 1 shows a perspective view of a piece of rock-wool onto which are placed separate blocks of rock-wool, in which plants are arranged, and wherein water is fed to the base substrate to the system as described in EP-A-0 300 536;

FIG. 2 is a schematic sectional view of a glasshouse in which substrate culture is employed and wherein the present invention is used;

FIG. 3 shows schematic view of a piece of substrate wherein a coupling member according to the present invention is applied; and FIG. 4 is a sectional view of another embodiment of a coupling member according to the present invention.

FIG. 1 shows a piece of rock-wool 1 onto which are placed four separate pieces of rock-wool 2 in which plants 3 are arranged. The root system of the plants 3 extends within the pieces of rock-wool 2 and also into the large piece of rock-wool 1, since the foil enveloping the piece of rock-wool 2 is discontinued at the point of the piece of rock-wool 1. The water present in the large piece of rock-wool 1 otherwise diffuses into the small pieces of rock-wool 2.

Arranged for feeding water to the rock-wool 1 is a pump 4 which is connected by means of lines 5 and 6 to two distribution lines 7 extending over the whole length of and inside the piece of rock-wool 1. Openings (not shown in the drawing) are arranged at regular mutual intervals in the distribution lines 7. The pump 4 is controlled by a control means 8 which receives input signals from a moisture content meter 9 which measures the degree of moisture in the rock-wool substrate 1. For discharge of the excess supplied water are arranged three drainage hoses 12.

The system described up to this point corresponds with that as stated in EP-A-0 300 536.

The present invention deviates therefrom with the arranging of coupling members 13 which extend in the substrate 1 and which form a connection between the rock-wool substrate 1 and the drainage line 12 (FIGS. 1 and 2).

A second embodiment is depicted in section in FIG. 2. Pieces of rock-wool 14 are here placed on inclining surfaces 15. These inclining surfaces are situated inside a glasshouse 16. In this case the plants 17 are placed directly into the piece of rock-Wool 14 without interpositioning of separate pieces of rock-wool. Also arranged are water feed pipes 18 which are connected to the substrate by means of water feed hoses 19. The superfluous water is here also discharged by means of drainage hoses 20 and drainage pipes 21. The operation of this system otherwise corresponds entirely with the system shown in FIG. 1.

FIG. 3 shows a schematic view of a coupling member 13 according to the present invention which in the present case extends wholly inside a piece of rock-wool 1. The coupling member 13 is formed by a torpedo-shaped body whereof one end is rounded and whereof the other end is provided with a bore 22 which extends over virtually the whole length of the coupling member. Inserted into the bore 22 is a piece of a drainage hose 12, where this drainage hose 12 is fixed against the head end of the coupling member by means of an edge of mastic 23.

For arranging of the coupling member 13 in the piece of rock-wool 1 holes are drilled in the locations intended for that purpose, into which holes the coupling members 13 are inserted. In the present embodiment the coupling member 13 extends over its whole length inside the rock-wool 1; it is also very well possible that it extends only partially inside the piece of rock-wool 1, as shown in the embodiment of FIG. 4. The maximum flow of the coupling member hereby decreases, however.

The coupling member 13 shown in FIG. 4 is otherwise provided with a point 24 so that in this embodiment it is no longer necessary to drill holes in the pieces of rock-wool beforehand; the coupling members can here be pressed directly, or possibly while being rotated, into the rock-wool. This embodiment further corresponds with the embodiment shown in FIG. 3.

The coupling members are preferably manufactured from rock-wool with a greater density than the rock-wool used as substrate. Experience has shown that the best results are obtained herewith.

Preferably, the porous body of the coupling member is formed of a mineral wool compressed such that the density thereof is greater than the density of the non-compressed mineral wool. The density of the compressed mineral wool forming the coupling member may lie between 10% and 20% greater than the non-compressed density.

It is not however to be precluded that other porous materials such as fired clay, which is commonly used for plant pots, be employed as base material. It is also possible to use sintered porous metals.

A number of needles arranged parallel to each other likewise possesses a structure suitable for a coupling member according to the present invention.

According to a preferred embodiment the length of the coupling member amounts to 65 mm, the diameter 15 mm and the diameter of the cavity is 6 mm.

An advantage of the use of a member of the described density manufactured from róck-wool is that such a member remains more moist than the surrounding rock-wool. Hereby prevented is that air enters the further drainage channel. It is the case that air in the drainage channel disturbs the suction action of the pump connected to the drainage channel.

The rock-wool is further preferably fixed with a binding agent so that the coupling member is form-retaining.

The embodiments of the invention in which an exclusive property or privilege is claimed are defined as follows:

1. In a system for culturing plants comprising a plant rooting substrate, means for supplying water to the substrate, and a drainage hose for discharging excess water from the substrate, the improvement which comprises a coupling member extending at least partially into the substrate, the coupling member comprising a porous body having a first end adapted for insertion into the substrate and a second end including a bore extending into but not through the porous body, the bore being sized to receive and hold the drainage hose partially within the coupling member, and the porous body being formed of a mineral wool more dense than the substrate and capable of transfusing water from substrate through the porous body into the bore.

2. The improved system of claim 1, wherein fluid discharge through the drainage hose is adjustable by varying the depth of insertion of the drainage hose into the bore to regulate the amount of bore available for transfusion from the porous body.

3. The improved system of claim 1, wherein the porous body is formed of a material substantially impervious to invasion by growing plant roots.

4. The improved system of claim 3, wherein the porous body is formed of mineral wool between 10% and 20% more dense than the substrate.

5. The improved system of claim 3, wherein the porous body is formed of mineral wool fixed with a binding agent.

6. The improved system of claim 1, wherein the porous body is formed of a ceramic material.

7. The improved system of claim 1, wherein the coupling member is substantially cylindrical along an axis defined by the first and second ends.

8. The improved system of claim 1, wherein the first end if shaped to facilitate insertion into the substrate.

9. The improved system of claim 8, wherein the first end is conical.

10. A valve means for adjusting a rate of fluid discharge from a plant rooting substrate into a drainage hose, the valve means comprising a porous body having a first end adapted for retention in the plant rooting substrate and a second end adapted to slidably receive and reversibly hold the drainage hose in a bore that extends into but not through the porous body, the porous body being formed of a material substantially impervious to invasion by growing plant roots and capable of transfusing water from the plant rooting substrate through the porous body into the bore, whereby the rate of fluid discharge through the drainage hose is adjustable by varying the depth of insertion of the drainage hose into the bore to regulate the amount of bore available for transfusion from the porous body.

11. The valve means of claim 10, wherein the porous body is formed of mineral wool more dense than the substrate.

12. The valve means of claim 11, wherein the porous body is formed of mineral wool between 10% and 20% more dense than the substrate.

13. The valve means of claim 10, wherein the porous body is formed of mineral wool fixed with a binding agent.

14. The valve means of claim 10, wherein the porous body is substantially cylindrical along an axis defined by the first and second ends.

15. The valve means of claim 10, wherein the first end is shaped to facilitate insertion into the substrate.

16. The valve means of claim 15, wherein the first end is conical.

17. In a system for culturing plants comprising a plant rooting substrate, means for supplying water to the substrate, and a drainage hose for discharging excess water from the substrate, the improvement which comprises a coupling member extending at least partially into the substrate, the coupling member comprising a porous body having a first end adapted for insertion into the substrate and a second end including a bore extending into but not through the porous body, the bore being sized to receive and hold the drainage hose partially within the coupling member, and the porous body being formed of a material capable of transfusing water from the substrate through the porous body into the bore, whereby the rate of fluid discharge through the drainage hose is adjustable by varying the depth of insertion of the drainage hose into the bore to regulate the amount of bore available for transfusion from the porous body.

18. A valve means for adjusting a rate of fluid discharge from a plant rooting substrate into a drainage hose, the valve means comprising a porous body having a first end adapted for retention in the plant rooting substrate and a second end adapted to slidably receive and reversibly hold the drainage hose in a bore that extends into but not through the porous body, the porous body being formed of a mineral wool more dense than the substrate and capable of transfusing water from the plant rooting substrate through the porous body into the bore, whereby the rate of fluid discharge through the drainage hose is adjustable by varying the depth of insertion of the drainage hose into the bore to regulate the amount of bore available for transfusion from the porous body.

* * * * *

UNITED STATES PATENT AND TRADEMARK OFFICE
CERTIFICATE OF CORRECTION

PATENT NO. : 5,152,808
DATED : October 6, 1992
INVENTOR(S) : Christiaan Blok It is certified that error appears in the above-identified patent and that said Letters Patent is hereby corrected as shown below:

| COLUMN | LINE | |
|---|---|---|
| [57] Abstract | 10 | "wood" should read --wool--; |
| 2 | 31 | after "substrate" insert --according--; |
| 2 | 36 | after "shows" insert --a--; |
| 2 | 40 | after "invention." insert the heading --<u>Detailed Description of the Preferred Embodiment</u>--; and |
| 3 | 5 | "rock-Wool" should read --rock-wool--. |

Signed and Sealed this

Twenty-eighth Day of September, 1993

*Attest:*

BRUCE LEHMAN

*Attesting Officer*       *Commissioner of Patents and Trademarks*